July 12, 1960 V. J. DE SANTIS ET AL 2,945,150
THERMIONIC CATHODES AND METHODS OF MAKING
Filed Dec. 11, 1958 2 Sheets-Sheet 1

INVENTORS:
JOHN H. AFFLECK,
VINCENT J. DESANTIS,
BY Philip L. Schlang
THEIR ATTORNEY.

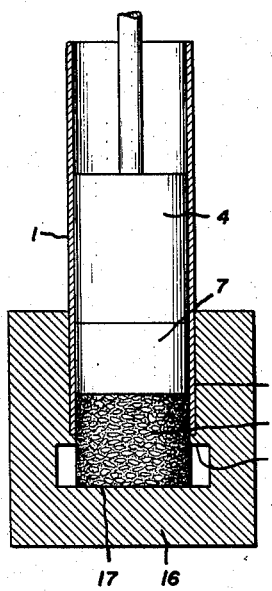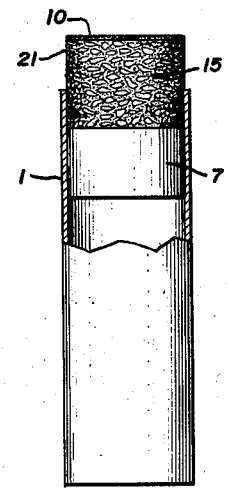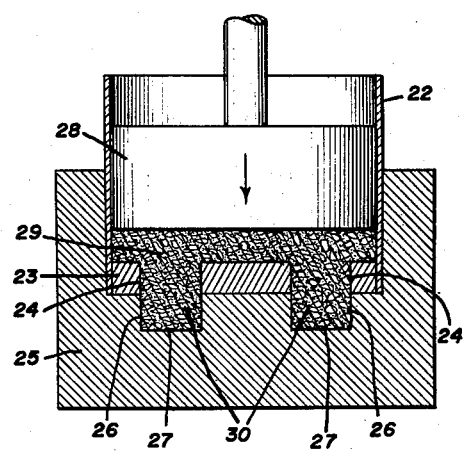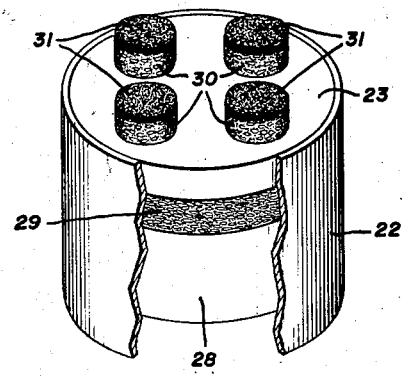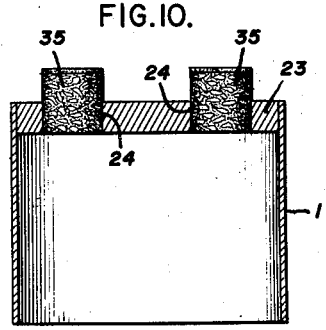

United States Patent Office 2,945,150
Patented July 12, 1960

2,945,150

THERMIONIC CATHODES AND METHODS OF MAKING

Vincent J. De Santis and John H. Affleck III, Schenectady, N.Y., assignors to General Electric Company, a corporation of New York Filed Dec. 11, 1958, Ser. No. 779,701

18 Claims. (Cl. 313—346)

Our invention relates to improved thermionic cathodes and methods of making same and pertains more particularly to cathodes adapted for large emission current densities and extremely low thermal noise during operation.

In co-pending U.S. Patent application Serial No. 518,547 of Virgil L. Stout filed June 28, 1955 and assigned to the same assignee as the present invention, there is disclosed and claimed an improved composite cathode and methods of making including a metal base member formed of a material selected from the group consisting of nickel, iron, platinum, tungsten, and tantalum, an intermediate spongy or porous alloy layer extending over and alloyed to the base member and an emissive coating infiltrated into and formed as a layer of the porous alloy. The porous alloy is prepared from a mixture of powdered metals selected from the group consisting of nickel, iron, platinum, and tungsten. One of these last-mentioned metals is mixed in a suitable binder with a suitable amount of a powder of an active metal or compound selected from the group consisting of titanium, zirconium and tantalum and the hydrides of these materials. The mixture is painted on the base member in a nitrocellulose binder following which the coated base member is vacuum-fired at a temperature sufficient to effect an alloying of the metal constituents of the mixture to the base member and together, resulting in a spongy or porous surface. Subsequently, the spongy surface is coated with an alkaline earth carbonate by painting thereon a liquid formed by mixing the carbonate powder in a suitable binder. The porous surface is highly absorbent and becomes impregnated with the carbonate. The mentioned active metal provides means for reducing the resulting oxides during operation of the device. Additionally, the mentioned active metal tends also to absorb any gas that may be liberated from the base metal or otherwise during the operation of the tube so as to minimize the possibility of "poisoning" the emissive cathode. The porous nature of the intermediate layer greatly extends the area of contact between the alloy and the emissive coating and enhances the ability of the layer to perform its reducing and gas-absorbing functions and at the same time greatly improves the mechanical adherence of the oxide coating to the cathode.

We have found that desirably uniform and stable emission current densities, resulting in higher power as well as lower thermal noise, are attainable when the ingredients of the porous alloy layers of Stout are formed as a compact sintered porous body having an extremely smooth and uniformly dense surface of emissive material. Additionally, we have found that the desired smooth and uniformly dense surface of emissive material for the above-mentioned purpose can be obtained through the agency of an extrusion step which is effective for providing a uniformly dense extremely smooth-surfaced porous body for receiving the oxide coating and which is also particularly effective for obtaining structures of particularly well-defined geometries and capable of meeting extremely close dimensional tolerances.

Accordingly, the primary object of our invention is to provide a new and improved cathode structure adapted for large emission current densities, long life and extremely low thermal noise during operation of an electric discharge device incorporating our cathode.

Another object of our invention is to provide new and improved methods of manufacturing thermionic cathodes having extremely smooth and uniformly dense emissive surfaces.

Another object of our invention is to provide a new and improved cathode and method of making same which involves the provision of a compact sintered porous body having uniformly densely compacted ingredients including interconnecting pores of substantially uniform distribution and size throughout the body, thereby to afford a uniform, smooth outer surface for being coated by an emissive material thus to obtain a uniform, smooth layer of emissive material.

Another object of our invention is to provide a new and improved method of forming cathodes including a porous body by extrusion of a mixture of powdered materials of which the body is formed.

Another object of our invention is to provide a new and improved cathode extrusion method which is particularly adapted for producing cathode elements of well-defined geometries and capable of meeting extremely close dimensional tolerances.

Another object of our invention is to provide a new and improved cathode and method of making same which provides a thermionic emitter having a plurality of discrete emissive areas.

Further objects and advantages of our invention will become apparent as the following description proceeds and the features of novelty which characterize our invention will be pointed out with particularity in the claims annexed to and forming part of this specification.

The objects of our invention can be carried out by utilizing the above-noted materials and compositions taught in the Stout application. However, instead of painting the base member with a mixture of powdered materials adapted for providing a porous alloy, we provide the mixture in an extrudable paste-like consistency and extrude it through a sleeve against a flat extremely smooth-surfaced die member and apply sufficient pressure to the extruded material to cause the powdered materials to become uniformly highly densely packed and the extruded end surface of the mixture to assume a smooth flat end surface corresponding in smoothness to the smoothness of the die surface.

In one form of our invention the flat surface of the alloy mixture can extend across the edge of the sleeve. In another form the alloy mixture can be extruded beyond or outwardly of the end of the sleeve. In still another form, the end of the sleeve can carry a member for defining the particular cross-sectional geometry of the extruded portion of the alloy mixture. For example, the end member can be formed with one or more apertures or bores of particular cross-sectional configurations and defining a particular pattern of discrete protruding areas of the alloy. The amount of protrusion and shape of the protrusions can also be determined by the depths and configurations of a female die of which the walls can comprise extremely smooth surfaces against which the mixture is compressed. After compression of the mixture against the mentioned die surfaces, a metal plug can be inserted behind the mixture following which the assembly is heated in a vacuum to form a porous alloy between the ingredients of the mixture and to the sleeve and plug. After this, the end surface of the porous alloy is painted with a liquid mixture of emissive material which is readily absorbed for impregnating the porous body. Subsequently, a less liquid mixture of emissive material is applied to the surface of the already impregnated alloy for obtaining a flat, extremely smooth uniformly dense emissive layer.

For a better understanding of our invention reference may be had to the accompanying drawing wherein:

Figures 6 and 7 are sectional views illustrating process steps of a modified form of our method and the structure obtainable thereby;

Figure 8 is a sectional illustration of a form of our invention whereby a cathode structure including a plurality of discrete protruding emissive areas is provided;

Figure 9 is a perspective illustration of a type of cathode including a plurality of discrete emissive areas which is obtainable with the form of our invention illustrated in Figure 8; and, Figure 10 is a modified form of the invention illustrated in Figures 8 and 9.

In accordance with a specific example of our invention applied to a composite cathode utilizing an alkaline earth coating, and as illustrated in Figures 1–5, we utilize a nickel cylindrical sleeve 1. In the manner shown in Figure 1, one end of the sleeve is closely fitted and bottomed in a two-piece female die 2 having a flat and extremely smooth die surface 3. The two-piece construction of the die 2 is to facilitate removal of the formed cathode therefrom. The sleeve is then partially filled with a quantity of a mixture of nickel and titanium hydride powders in a quantity of nitrocellulose or other suitable volatile binder sufficient to provide a mixture having a thick, extrudable, paste-like consistency. The exact percentages of titanium hydride and nickel used may be varied; however, a mixture of about 95% nickel and about 5% titanium hydride has been used with particularly good success.

Figure 1:
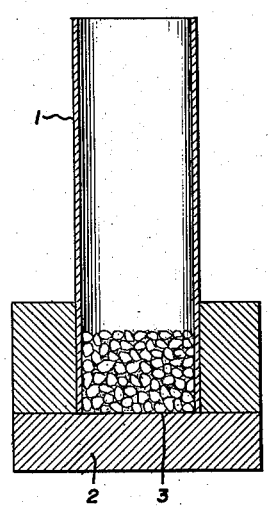
Figures 1–5 are sectional views illustrating some of the process steps involved in one form of our invention and the structure obtainable thereby.
Figure 2:
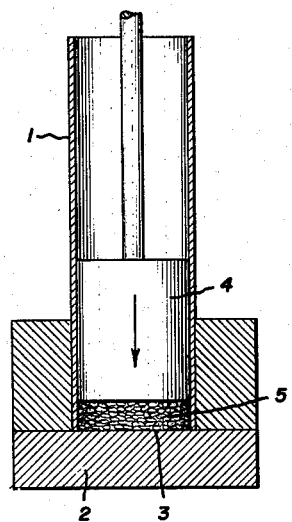
Figure 3:
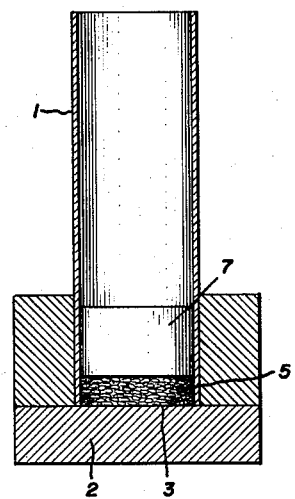

Following introduction of the paste-like mixture into the sleeve 1, a plunger 4 is used in a manner shown in Figure 2 for extruding the mixture in the sleeve 1 into a discrete compact body 5 and compressing it against the extremely smooth surface 3 of the die 2. The pressure applied to the plunger 4 is sufficient to cause the body to have a uniformly highly dense consistency and to have an extremely smooth flat end surface 6 corresponding to the extremely smooth bottom surface 3 of the die. The next step involves removing the plunger 4 and substituting therefor a nickel plug or backup member in the sleeve 1 behind the body 5 and in the manner illustrated in Figure 3. The nickel backup plug may be inserted before pressing. Plunger 4 would then act against this plug.

Figure 4:
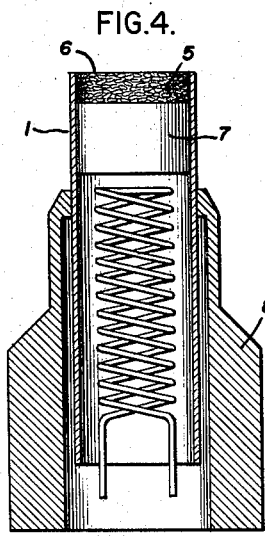

Thereafter, and as shown in Figure 4, the sleeve 1 is fitted for brazing in a tubular support 8 which is preferably formed of a highly refractory metal such as molybdenum. A suitable brazing material, such as titanium hydride, is provided between the adjoining surfaces of the sleeve and support and the assembly is heated in a vacuum furnace to a temperature of approximately 800° C. for about ten minutes and then to about 1300° C. for approximately one minute. During these firing steps, brazing of the sleeve to the support is effected. Additionally, and concurrently, the hydrogen of the hydride is released and the nickel and titanium powders of the body 5 are alloyed together and to the nickel sleeve 1 and the nickel plug 7. The alloying of the powders is at the surface of the nickel particles and the resultant alloy surrounding the remaining solid nickel particles has a composition dependent upon the temperature of the vacuum firing.

As a result of firing, the compact body 5 assumes the nature of a sintered porous alloy body wherein the metal particles therein are densely arranged with the interconnecting pores which render the body porous being evenly distributed throughout the body and being essentially equally sized and minute relative to the particle sizes. The high density of the constituent body particles and the small uniform size of the interconnecting pores enables us to obtain the desired flatness and extreme smoothness of the surface 6. Following the firing step, the sintered body 5 is impregnated with alkaline earth carbonates by painting on the surface 6 a liquid mixture formed by mixing carbonate powders in a suitable volatile liquid binder, such as, nitrocellulose or isobutylmethacrylate. The body 5 is absorbent and the liquid mixture is readily absorbed by capillary mechanisms thereby to effect the mentioned impregnation of the body with alkaline earth carbonates. Subsequently, a thicker or less liquid mixture of alkaline earth carbonate powder formed by admixing the carbonate powders in a suitable but lesser amount of binder is applied to the surface 6. Due to the fact that the surface 6 is extremely smooth and flat, the last-mentioned alkaline earth coating provided thereon is also extremely smooth and flat. This results from the fact that the close density or compactness of the materials comprising the surface 6 of the body 5 avoids the presence of any substantial surface crevices or pores which would tend to absorb greater amounts of the material of the coating 10 and thus cause a corresponding rough or irregular texture of the outer surface of the coating 10.

Figure 5:
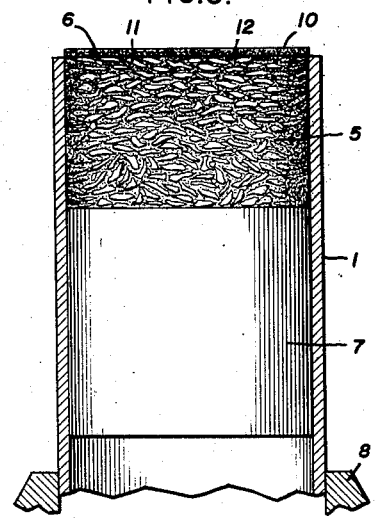

In Figure 5 is schematically illustrated the type of structure obtainable by means of the above-described specific example. As seen, the finished product includes the nickel sleeve 1 supported in the member 8 and containing the nickel plug 7. The porous body 5 is compressed or compacted such that the nickel-titanium alloy indicated by 11 is uniform and highly dense. This uniformity and high density which, as pointed out above, resulted from the above-described compression step in our method in conjunction with the use of the flat extremely smooth surface 3 of the die 2 affords, as pointed out above, the extremely smooth, flat outer surface 6 on the body 5. The step of painting the surface 6 of the body 5 with a liquid mixture of alkaline earth carbonate powders affords the impregnation of alkaline earth oxide indicated at 12. The subsequent coating of the surface 6 with a thicker mixture of alkaline earth carbonate powders affords the uniform, high density oxide layer 10. This uniform, high-density layer 10, together with the smooth flat surface 6 of the body 5, affords a smooth flat uniform dense emissive surface. The density of oxide on this surface increases substantially the current emission available from the cathode, thus to enable higher power operation. Additionally, an important feature of the device that contributes to low thermal noise is the uniform density of electrons resulting from the uniformly dense oxide coating 10 on the surface 6. These electrons afford a uniformly dense electron cloud in the charged region above the cathode surface with resultant uniform electron energy in this region. Thus, the potential minimum at or above the emitting surface is substantially absolutely parallel to this surface. Further, the extreme smoothness and density of the oxide surface enables extremely close and uniform interelectrode spacing of the cathode in relation to other elements such as a planar grid. Still further, in our structure and by means of our above-described method including the extrusion of the mixture against a flat, extremely smooth die surface, the uniformly smooth surface 6 contains interconnecting pores of interstices which are generally uniformly distributed and of uniform minute size throughout the body 5. This contributes to the attainment of the uniformly dense smooth oxide coating.

Illustrated in Figures 6 and 7 is a modified form of cathode obtainable by our method and which is particularly useful in devices in which it is desirable to provide emissive areas on both side and end surfaces of the emitter. As seen in Figures 6 and 7, this structure includes a sleeve 1, a backup plug 7 and a compressed porous body 5. The body 15 can be formed of the same material as the body 5 in the first-described embodiment but differs therefrom by extending or protruding longitudinally beyond the end of the sleeve 1. The end protrusion of the body 15 is obtained by extruding the mixture of which the body is formed from the end of the sleeve 1 and into a female die 16 of the type illustrated in Figure 6. The die 16 includes a smooth flat bottom surface 17, and a shoulder 18 spaced a predetermined distance above the surface 17. The sleeve 1 is first closely fitted in the die to rest on the shoulder 18. Then the sleeve is partially filled with the alloy mixture, following which the mixture is extruded from the end of the sleeve into the die and compressed against the surface 17 by means of a plunger 4 and to assume the compressed form shown in Figure 7. The location of the shoulder 18 above the surface 17 determines the amount of extrusion of the body 15 and therefore the length of the exposed lateral surface of the protruding body. Undercuts 19 in the side wall of the die can be provided to facilitate removal of the formed cathode.

As also shown in Figure 7, the backup plug 7 is fitted behind the body 15 either before or after the pressing operation. Thereafter, the body 15 is processed in a manner described above to effect sintering and alloying of the various materials and to provide a uniformly smooth and dense oxide coating or layer 10. In this embodiment, however, the oxide material is sufficiently penetrating of the exposed transverse end surface of the body to provide emissivity from the lateral surface 21 as well as from the surface of the layer 10.

In Figures 8 and 9 is shown a modified form of our invention including a plurality of discrete emissive areas and which is particularly applicable to beam type devices including, for example, traveling wave tubes which require a plurality of parallel electron beams for operation. As illustrated in Figure 8, this form of our invention involves the use of a nickel sleeve 22 fitted at one end with an apertured or bored nickel end member 23. The member 23 includes a plurality of spaced circular apertures or parallel bores 24 and is positioned in the sleeve with the outer surface preferably flush with the edge of the sleeve. In obtaining the structure of Figure 9, the end of the sleeve having the member 23 positioned therein is fitted closely in a female die generally designated 25 and including a plurality of individual cylindrical female dies or recesses 26 in the bottom thereof and corresponding to the array of bores 24 in the end member 23. The bottom surfaces 27 of the individual female dies 26 are flat and both these surfaces and the cylindrical side walls are extremely smooth.

In practicing the method, the apertures 24 in the end member and the female die 26 are held in vertical register and a quantity of the above-described extrudable mixture of powdered materials is placed in the sleeve. Thereafter, a plunger 4 is used to extrude the mixture through the sleeve 22 to form it into a compressed composite body 29 and to extrude quantities of the mixture into each of the smooth-walled female dies 26 to provide discrete compressed longitudinally extending portions 30 of the body. Following this step, the plunger 4 is removed, a nickel backup member 28 is inserted and the device is removed from the die 25 and processed in the manner described above including the vacuum firing step which results in converting the body 29 to a porous sintered compressed alloy in which the metal constituents are alloyed together and to the sleeve 22, the member 28 and the contiguous surfaces of the end member 23. If desired, the backup member 28 can be placed behind the mixture before the plunger is inserted and operated to compress the mixture. In the presently described form of our invention, the end and side surfaces of the protruding portions 30 of the body 29 are rendered uniformly dense and extremely smooth in the same manner and for the same purpose as the single protrusion shown in Figure 7. Subsequently, also, the ends of the protruding portions 30 are first impregnated with a liquid alkaline earth carbonate mixture and then coated with a relatively thicker alkaline earth carbonate mixture to provide a uniformly dense and extremely smooth lay 31 in the manner described above in connection with the single protrusion of Figure 7. In a manner similar to that described above with regard to Figure 7, the protrusions 30 are emissive from both the end surface 31 and the lateral surfaces adjacent the end. This results from the fact that some of the emissive material penetrates inwardly of the end surfaces of the protrusions. As indicated above, this type of cathode is particularly applicable for multiple beam tubes.

If desired, and as seen in Figure 10, no porous alloy need be provided behind the end member 23. Instead, in practicing our invention and utilizing the die 25 of Figure 8, one can use only enough mixture for extruding through and filling the bores 24 in the end member 23 to provide discrete protruding bodies 35. The device of Figure 10 can be otherwise formed and processed in the same manner as the device of Figure 9. It will be noted, however, that no backup member need be provided in the sleeve 1, the sleeve 1 being effective for containing any electrons tending to be emitted backwardly or thereinto from the oxide impregnated bodies 35.

It will be understood from the foregoing that while we have disclosed specific embodiments of our structure including nickel sleeves, backup members and end members, our invention is not limited to such material but can be effectively practiced utilizing elements formed of other metals such as iron, tungsten, and tantalum. Additionally, while we have described the employment of mixtures of nickel and titanium hydride, other mixtures have been and can be satisfactorily employed. For example, the powders of elemental titanium, zirconium, and tantalum and the hydrides thereof can be effectively employed with elemental powders of iron, platinum, tungsten, and tantalum; and these materials are employable in the same percentage compositions taught above with respect to the described specific example. Still further, while the alkaline earth carbonates such as barium, calcium, and strontium carbonates, or mixtures thereof can be effectively employed in providing impregnating and coating mixtures for the porous alloy, other coatings such, for example, as thorium oxide can be effectively employed.

It will be further understood from the foregoing that our extrusion method of forming cathodes is particularly desirable for obtaining emissive areas of predetermined configurations. For example, the sleeves 1 in the drawing and the apertures or bores 24 in the backup member 23 and the female dies need not be circular in cross-section but can be of any desired configuration such, for example, as elliptical or square. In the case of the structure of Figures 1-5 the cross-sectional configuration of the sleeve 1 will determine the configuration of the emissive area. However, in the case of the device including protruding emissive areas, the bores 24 and the dies receiving and shaping the protruding portions can be correspondingly and selectively shaped to provide the desired configuration. Additionally, it will be understood that our invention by being adapted for providing emissive areas of substantially any configuration can be readily adapted for effecting hollow electron beams which are desirable in some types of tube structures.

It will also be appreciated from the foregoing that certain features of our invention are not limited to the employment of the porous alloy bodies which, after formation, are impregnated and coated with alkaline earth carbonate mixtures. Instead, the feature of our invention involving the extrusion of the body material to provide protruding emissive areas is employable with any emitter mixture which can be formed in an extrudable or paste-like consistency. For example, in the prior art, there are found various emitter mixtures composed of powdered metals and emissive alkaline materials. These can be used with a suitable binder to provide a suitable paste-like mixture which can be extruded from the end of a sleeve as in Figure 6 or through bores in an end member as in Figure 8 for protruding into and being formed by female dies of desired configurations to provide extending emissive areas of desired configurations.

While we have shown and described specific embodiments of our invention, we do not desire our invention to be limited to the particular forms shown and described, and we intend by the appended claims to cover all modifications within the spirit and scope of our invention.

What we claim as new and desire to secure by Letters Patent of the United States is:

1. A thermionic cathode comprising a sintered compressed porous body substantially wholly formed of metal particles alloyed together by a metal selected from the group consisting of titanium, zirconium, and tantalum, the metal particles of said body being densely compact and the interconnecting pores of said body being uniformly distributed and essentially uniformly minute throughout at least a surface portion of said body for affording an extremely smooth outer surface on said body, an emissive oxide material disposed in the pores of said body and an extremely smooth emissive oxide coating on said smooth outer surface of said body and being more uniform and of greater density than the oxide impregnating said body.

2. A thermionic cathode comprising a member of metal selected from the group consisting of tungsten, iron, nickel and tantalum and including a longitudinal bore, a sintered compressed porous body of metal particles positioned in said bore and selected from the group consisting of nickel, iron, platinum and tungsten and alloyed together and to said member by a metal selected from the group consisting of titanium, zirconium, and tantalum, the particles of said body being densely compact and the pores between said particles being substantially uniformly distributed and essentially uniformly minute throughout at least a surface portion of said body for affording an extremely smooth outer surface on said body extending transverse the longitudinal axis of said bore, an emissive oxide material disposed in the pores of said body, and an extremely smooth emissive oxide coating on said smooth outer surface of said body and of uniform thickness and greater density than the oxide impregnating said porous body.

3. A thermionic cathode according to claim 2 wherein said first-mentioned metal particles comprise about 95% of said porous body and said alloying metal comprises the remainder.

4. A thermionic cathode comprising a member of metal selected from the group comprising tungsten, iron, nickel and tantalum and including a longitudinal bore, a sintered porous body of metal particles positioned in said bore, said metal particles being selected from the group comprising nickel, iron, platinum and tungsten and alloyed together and to said member by a metal selected from the group consisting of titanium, zirconium and tantalum, said porous body including a portion extending longitudinally from the end of said bore and having a flat transverse end surface, said body also being densely compact and having substantially uniformly distributed and essentially uniform minute pores rendering said transverse end surface extremely smooth, an emissive oxide material impregnating said porous body, and a uniformly dense, extremely smooth coating of emissive oxide on said extremely smooth transverse end surface and being of greater density than the oxide distributed in said body.

5. A thermionic cathode according to claim 4 wherein said member comprises a sleeve, and a backup member of metal selected from the same group as said sleeve is positioned in said sleeve and is also alloyed to said sintered porous body.

6. The method of making a composite cathode comprising the steps of preparing a paste-like mixture of a first powdered ingredient selected from the group consisting of iron, nickel, platinum and tungsten, a second ingredient selected from the group consisting of titanium, zirconium and tantalum and the hydrides thereof and a suitable binder, extruding said mixture through the bore of a metal member selected from the group consisting of tungsten, iron, nickel and tantalum and compressing the extruded mixture against an extremely smooth flat surface extending transverse the end of said bore to obtain an extremely smooth flat surface on the extruded end of said mixture, heating said metal member and mixture in a vacuum to a temperature at which said mixture is converted to a compressed porous body of sintered alloy of the ingredients thereof and is alloyed to said metal member, then impregnating said porous body with a liquid mixture of an emissive oxide, and then coating said extremely smooth flat surface on said porous body with a relatively thicker and uniformly dense mixture consisting of an emissive oxide and a binder.

7. The method of making a composite cathode as defined in claim 6 including the further step of placing a metal backup member selected from the same group as the metal of the member including said bore behind said mixture in said bore before the heating step to obtain alloying of said mixture to said backup member upon heating.

8. The method of making a composite cathode as defined in claim 6 including the further step of fitting said metal member in a highly refractory metal support and effecting a braze between said metal member and support concurrently with said sintering step and through the agency of the said heating operation.

9. The method of making a composite cathode including an exposed emissive portion having a lateral surface of predetermined length and a transverse end surface of predetermined configuration comprising the steps of preparing a paste-like mixture of a powdered emitter material, extruding said mixture through and longitudinally outwardly of the end of a bore in a metal element, and compressing the thus extruded portion of said mixture into a female die of a predetermined depth and cross-sectional configuration corresponding to the desired length and cross sectional configuration, respectively, of said exposed emissive portion.

10. The method of making a composite cathode including a plurality of discrete exposed emissive portions each having a lateral surface of predetermined length and a transverse end surface of predetermined configuration comprising the steps of preparing a paste-like mixture of a powdered emitter material, extruding said mixture through and longitudinally outwardly of the ends of a plurality of bores disposed in a predetermined pattern in a metal element, and compressing the thus extruded portions of said mixture into registering female dies of predetermined depths and cross-sectional configurations corresponding to the desired length and cross sectional configuration, respectively, of said exposed emissive portions, thereby to obtain an emitter having a plurality of discrete emissive ends having predetermined exposed emissive end and lateral surface areas.

11. The method of making a composite cathode comprising the steps of preparing a paste-like mixture of a first powdered ingredient selected from the group consisting of iron, nickel, platinum and tungsten, a second powdered ingredient selected from the group consisting of titanium, zirconium, and tantalum and the hydrides thereof and a suitable binder, extruding said mixture through and substantially outwardly of the end of a bore in a member of metal selected from the group consisting of tungsten, iron, nickel and tantalum, compressing the thus extruded portion of said mixture into a female die having a flat and extremely smooth bottom surface, thereby to obtain a longitudinally extending portion of said mixture having an extremely smooth and flat end surface, removing said die, heating said sleeve and mixture to a temperature at which said mixture including said extending end is converted to a porous body of compressed sintered alloy of the ingredients therein and is alloyed to said sleeve, then impregnating said extending portion of said porous body with a mixture of an emissive oxide in a liquid vehicle, and thereafter coating said flat end of said extending portion of said body with a relatively thicker and uniformly dense mixture consisting of an emissive oxide and a liquid binder.

12. The method of making a composite cathode defined by claim 11 wherein the first powdered ingredient comprises about 95% of said mixture and the second powdered ingredient comprises the remainder.

13. The method of making a composite cathode comprising the steps of preparing a paste-like mixture of a first powdered ingredient selected from the group consisting of iron, nickel, platinum and tungsten, a second powdered ingredient selected from the group consisting of titanium, zirconium and tantalum and the hydrides thereof and a suitable binder, extruding said mixture through and substantially outwardly of the ends of a plurality of spaced parallel bores disposed in a predetermined pattern in a member of metal selected from the group consisting of tungsten, iron, nickel and tantalum and compressing the thus extruded portions of said mixture into a plurality of extremely smooth-walled female dies registering with said bores and having predetermined depths and cross-sectional configurations and flat bottoms, thereby to obtain an emitter including a plurality of discrete longitudinally extending extremely smooth-surfaced and flat-ended portions of said mixture, removing said dies, heating said member and extruded mixture to a temperature at which said mixture including said longitudinally extending portions is converted to a porous body of sintered alloy of the ingredients thereof and is alloyed to said member, then coating said extending portions of said porous body with a mixture of an emissive oxide in a liquid vehicle whereby said body is impregnated with said oxide by absorpton, and thereafter coating the flat ends of said extending portions of said body with a relatively thicker and uniformly dense mixture consisting of an emissive material and a liquid binder.

14. A cathode assembly comprising a sleeve of metal selected from the group consisting of tungsten, iron, nickel and tantalum, a sintered porous body of metal particles positioned in the end of said sleeve and alloyed therewith, said body being substantially wholly formed of metal particles alloyed together by a metal selected from the group consisting of titanium, zirconium, and tantalum, the metal particles of said body being densely compact and the interconnecting pores of said body being uniformly distributed and essentially uniformly minute throughout at least a surface portion of said body for affording an extremely smooth outer surface on said body, an emissive oxide material disposed in the pores of said body, an extremely smooth emissive oxide coating on siad smooth outer surface of said body and being uniform and of greater density than the oxide impregnating said body, and a backup member formed of the same material as said sleeve and positioned transversely in said sleeve and alloyed to said body.

15. A cathode assembly comprising a metal member including a bore and a sintered porous body of metal particles positioned in said bore, said body being substantially wholly formed of metal particles alloyed together by a metal selected from the group consisting of titanium, zirconium, and tantalum, the metal particles of said body being densely compact and the interconnecting pores of said body being uniformly distributed and essentially uniformly minute throughout at least a surface portion of said body for affording an extremely smooth outer surface on said body, an emissive oxide material disposed in the pores of said body and an extremely smooth emissive oxide coating on said smooth outer surface of said body and being more uniform and of greater density than the oxide impregnating said body, and said oxide coated surface being disposed longitudinally outwardly of the end of said bore.

16. A cathode assembly according to claim 15 wherein said metal member includes a plurality of spaced parallel bores each having one of said porous bodies positioned therein and wherein the oxide-coated surfaces of all of said bodies are disposed longitudinally outwardly of the ends of said bores.

17. A cathode assembly comprising a sleeve of metal selected from a group consisting of tungsten, iron, nickel, and tantalum, a transverse end member of metal selected from the same group positioned in one end of said sleeve, said end member including a plurality of spaced parallel bores, and a sintered porous body of metal particles positioned in each said bores and alloyed to said end member, said porous bodies each being substantially wholly formed of metal particles alloyed together by a metal selected from the group consisting of titanium, zirconium, and tantalum, the metal particles of each said bodies being densely compact and the interconnecting pores being uniformly distributed and essentially uniformly minute throughout at least a surface portion of said body for affording an extremely smooth outer surface on said body, an emissive oxide material disposed in the pores of said body and an extremely smooth emissive oxide coating on said smooth outer surface of said body and being more uniform and of greater density than the oxide impregnating said body.

18. A cathode assembly comprising a sleeve, a transverse end member of metal selected from the group consisting of tungsten, iron, nickel, and tantalum positioned in one end of said sleeve, said end member including at least one bore extending longitudinally therethrough, a sintered porous body of metal particles positioned in said sleeve behind said end member and including a portion extending in said bore, said body being substantially wholly formed of metal particles alloyed together by a metal selected from a group consisting of titanium, zirconium, and tantalum, the metal particles of said body being densely compact and the interconnecting pores of said body being uniformly distributed and essentially uniformly minute throughout at least a surface portion of said body extending transverse the longitudinal axis of said bore for affording an extremely smooth outer surface on said extending portion, an emissive oxide material disposed in the pores of said body and an extremely smooth emissive oxide coating on said smooth outer surface of said portion of said body and being more uniform and of greater density than the oxide impregnating said body, a backup member of metal selected from the same group as said sleeve and said transverse member positioned in said sleeve behind said porous body, and said porous body being alloyed to said sleeve, end member and backup member.

References Cited in the file of this patent

UNITED STATES PATENTS

| 2,813,220 | Coppola | Nov. 12, 1957 |
| 2,830,218 | Beggs | Apr. 8, 1958 |

FOREIGN PATENTS

| 202,582 | Australia | July 19, 1956 |
| 766,829 | Great Britain | Jan. 23, 1957 |